United States Patent [19]

Iida

[11] Patent Number: 4,821,013

[45] Date of Patent: Apr. 11, 1989

[54] PRESSURE SENSING DEVICE

[75] Inventor: Hideo Iida, Inamachi, Japan

[73] Assignee: Kokoku Rubber Technologies Inc., Tokyo, Japan

[21] Appl. No.: 124,977

[22] Filed: Nov. 24, 1987

[51] Int. Cl.⁴ .............................................. H01C 10/10
[52] U.S. Cl. ..................................... 338/114; 338/99
[58] Field of Search ........................ 338/114, 99, 176

[56] References Cited

U.S. PATENT DOCUMENTS 3,386,067 5/1968 Costanzo ..................... 338/114 X
4,571,542 2/1986 Arai ................................ 338/99 X
4,651,123 3/1987 Zepp ................................... 338/176

Primary Examiner—Clifford C. Shaw
Assistant Examiner—M. M. Lateef
Attorney, Agent, or Firm—Gifford, Groh, Sheridan, Sprinkle and Dolgorukov

[57] ABSTRACT

A pressure sensing device constructed of a high molecular conductor kept in contact at all times with at least one pair of electrodes in a circuit and wherein the resistance of the conductor is sensitive to external forces oppositely applied by an actuator and a spring. Changing of the relative value of the forces changes the conductor resistance thus changing the circuit resistance.

9 Claims, 2 Drawing Sheets

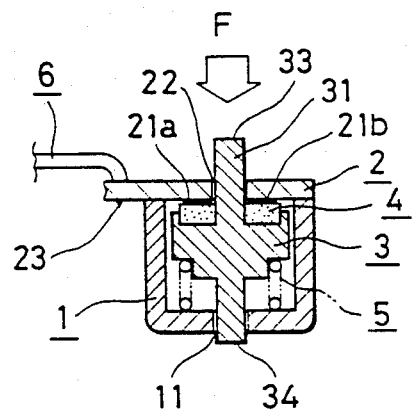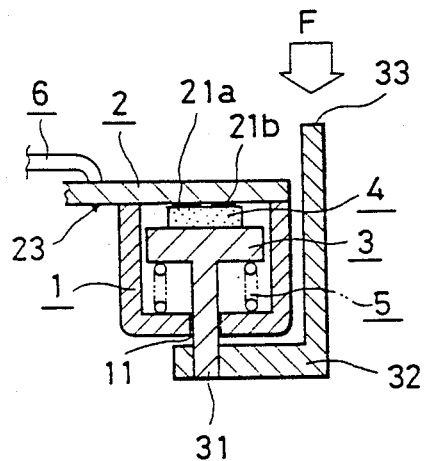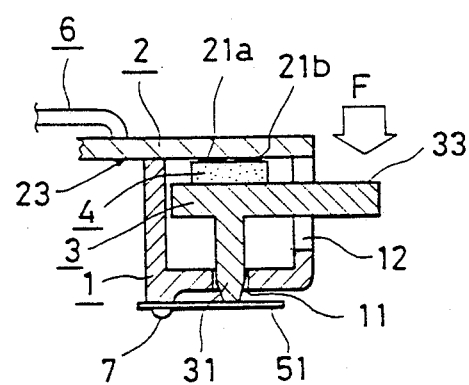

PRESSURE SENSING DEVICE

BACKGROUND OF THE INVENTION (1) Field of the Invention

The present invention relates to a pressure sensing device which can be utilized for shift position control of information processing equipment, office equipment, industrial equipment, home equipment, electronic equipment, building, automobile, vessel and so forth, pressure control actuated on a pressure source such as fluid pressure, air pressure and the like, and also for detection means for automatically detecting size, weight and so forth.

(2) Description of the Prior Art

FIG. 6 shows a known pressure sensing device in which an armored case 1 is provided on an electrode substrate 2 together with a pair of electrodes 21a, 21b and an actuator (or plunger) 3. A high molecular conductor 4 and a compression spring 5 are contained in the armored case 1. The high molecular conductor 4 and the electrodes 21a, 21b are normally kept non-contacted by the compression spring 5.

Then, a guide hole 11 is perforated in the armored case 1, a shaft 31 protruding from the center of the actuator 3 is inserted therein to pass externally, and a top or nose portion 33 of the shaft 31 is formed as an external force receiving part.

In the prior art construction described above, when an external force is given to the nose portion 33 of the actuator 3, the actuator 3 descends against a tension of the spring 5, the high molecular conductor 4 provided on the actuator 3 comes in contact with the electrodes 21a, 21b and thus is conductive to function as an electric switch.

Then, upon releasing the external force to the actuator 3, the high molecular conductor 4 is isolated from the electrodes 21a, 21b by a retaining strength of the spring 5, thus opening the switch.

The prior art exemplified as above comprises one kind of switch wherein contacts wrought with a high molecular conductor are disposed in opposition so as to keep a space with the electrodes at all times through spring or other means. The contacts of the molecular conductor are brought into contact with the electrodes when an external force is applied thus causing an electrical signal. However, using this as a detecting part involves various problems such that (1) the distance between the electrode and the contact must be shortened or a spring force must be weakened for securing high sensitivity, which may result in causing an erroneous operation due to vibration or other reason and losing a reliability, (2) a displacement called after stroke is necessary for detecting a position of matters in transit as it is difficult to stop the matters moving suddenly after the position is detected, however, the displacement as after stroke cannot be secured thoroughly, (3) dispersion and secular change of the contact resistance value due to external force are heavy, and that (4) since a space is formed, a deterioration due to incoming of dust and dirt cannot be avoided.

The invention has been done in view of the aforementioned defects, and its object is to provide a pressure sensing device which is capable of replacing a change in pressure with an electrical signal by utilizing characteristics of a high molecular conductor.

SUMMARY OF THE INVENTION

The invention relates to a pressure sensing device, which comprises providing a high molecular conductor kept in contact at all times with at least one pair of electrodes, and thus is capable of increasing or decreasing an electric resistance value between the electrodes accordingly by giving or releasing tension of a spring to the high molecular conductor upon receipt of an external force.

Then, the portion whereat the external force is received is an actuator, and the actuator operates preferably for linear reciprocation, rotation round a pivot and the like, which can be constructed with a single or plural member.

BRIEF DESCRIPTION OF THE DRAWINGS

FIG. 1 to FIG. 4 are sectional views representing four embodiments of a pressure sensing device relating to the invention;

DETAILED DESCRIPTION OF PREFERRED EMBODIMENTS

Figure 4:
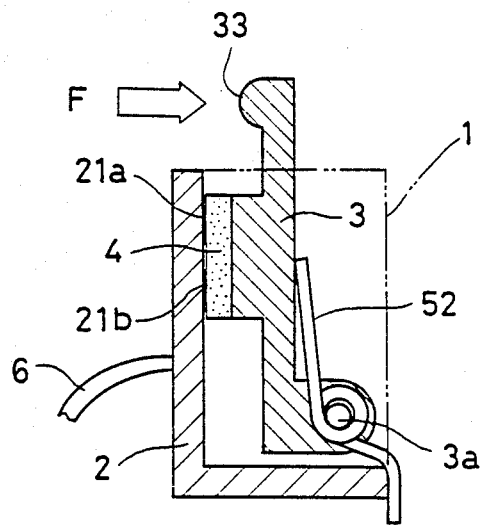

First, one embodiment of the invention will be described with reference to FIG. 1. The drawing is a longitudinal sectional view of a pressure sensing device, which is constructed as follows.

An actuator 3 with a pressure sensitive element 4 formed of a high molecular conductor fixed thereon is brought into contact with a circuit substrate 2 having a pair of electrodes 21a, 21b formed thereon by means keeping the electrodes 21a, 21b and the pressure sensing element 4 in opposition. The pressure sensing element 4 is in fact pressed onto the electrodes 21a, 21b by a compression spring 5 inserted between an armored case 1 and the actuator 3, thereby constituting a resistance circuit between the electrodes 21a, 21b. An operating shaft 31 and a guide shaft 34 extend vertically to a plane including the electrodes 21a, 21b through the armored case 1 and the circuit substrate 2 at the center of the actuator 3, and thus the direction in which the actuator 3 moves is kept constant. Through holes 11 and 22 in the armored case 1 and the circuit substrate 2 accept the shafts 31 and 34 of the actuator 3 therethrough, thus functioning as a guide for the actuator 3 to move. Then, a nose portion 33 of the shaft 31 extending through the circuit substrate 2 functions as a guide to transfer an external force to the actuator 3. A terminal 23 for connecting a lead wire 6 for transmitting an electrical signal to an external control circuit (not indicated) is provided on the circuit substrate 2.

When an external pressure (force) works on the shaft nose 33 of the actuator 3, a pressure applied on the pressure sensing element 4 consisting of a high molecular conductor changes, and a resistance value between the electrodes also changes. That is, if the external force increases, then a pressure applied on the pressure sensing element 4 consisting of a high molecular conductor decreases, and thus a resistance value between the electrodes 21a, 21b increases.

Then, the aforementioned high molecular conductor (pressure sensing element) 4 is formed of a rubber material with desired conductive particles, carbon particles for example, dispersed uniformly therefor, and when compressed by a desired pressure given thereto, the aforementioned carbon particles come near to each other to increase electric conductivity according to increase of the pressure, and electric resistance decreases. Upon releasing the pressure, the electric resistance begins to increase gradually and thus it returns finally to an original form and the electric resistance also returns to an initial value.

Figure 5:
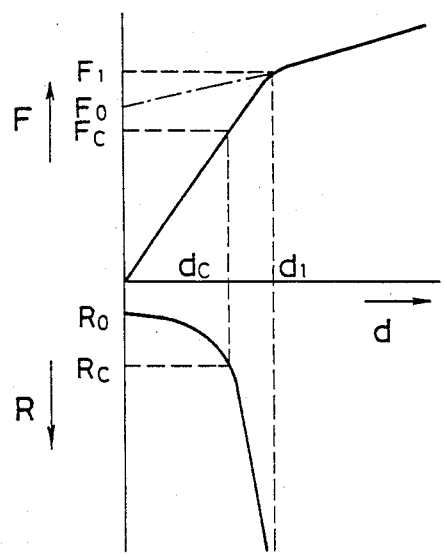
FIG. 5 is a function graph of the embodiment of FIG. 1.
Figure 6:
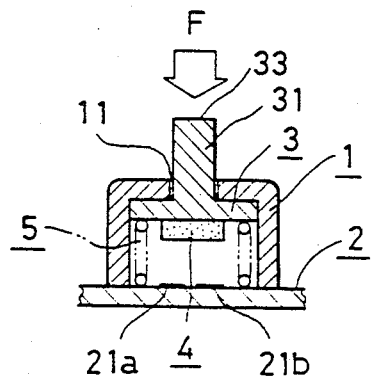
FIG. 6 is a sectional view of a prior art pressure sensing device.

Next, the function will be described with reference to a graph of FIG. 5 according to the abovedescribed construction.

First, in the condition where an external pressure (force) F does not work on the nose portion 33 of the actuator 3, the high molecular conductor (pressure sensing element) 4 is pressed to and so retained on the electrodes 21a, 21b of the electrode substrate 2 by a force $F_0$ of the pressure-welded spring 5 compressed and loaded, thus forming a resistance circuit between the electrodes 21a, 21b. In this case, the high molecular conductor 4 is subjected to compression and deformation by the force $F_0$ of the pressure-welded spring 5 and thus is displaced by $d_1$. When working the external pressure (force) F on the nose portion 33 of the actuator 3, a displacement d of the actuator 3 also increases according to an increase of the external pressure (force) F, and if $F=F_1$ when $d=d_1$, the high molecular conductor 4 is isolated from the electrode substrate 2, and thus a circuit between the electrodes 21a, 21b is opened. In this case, a relation holds as $F_1=F_0+d_1 K$ (K being a spring constant of the pressure-welded spring 5).

Then, from setting a displacement of the pressure welded spring 5 greater than $d_1$, a displacement of the actuator 3 can also be secured even after the circuit between the electrodes is opened, and thus a so-called after stroke can be taken.

The resistance between the electrodes 21a, 21b increases infinitely from an initial resistance value $R_0$, and the pressure sensing device will function as a pressure sensor.

In case the pressure sensing device of the invention is used for operation of a control circuit, if a resistance value necessary for the operation is $R_c$, then a displacement of the actuator 3 becomes $d_c$, and an external pressure (force) $F_c$ will be required.

Further, from selecting the pressure-welded spring 5 properly, $F_1$, $F_0$, $d_1$ can be changed, therefore an extensive range of application can be expected.

Then, some test examples with individual size and shape varied as holding the structure shown in FIG. 1 will be given as follows:

(Test example 1)

A pressure sensing device with the construction shown in FIG. 1 was obtained to comprise the printed substrate 2 having a pair of electrodes 21a, 21b, the circular high molecular conductor pressure sensing element 4 8 mm in outside diameter, 2 mm in inside diameter and 1 mm in thickness, the actuator 3 having a portion for transferring an external force, and the pressure-welded spring 5 20 g/mm in spring constant and ready for locking through compression by 2.5 mm. With $R_0=10\Omega$, $d_1=0.20$ mm and $F_1=50$ g, the pressure sensing device operates as an exceedingly fine pressure sensor wherein a resistance value between the electrodes increases in accordance with an increase of the displacement d of the actuator 3 until the displacement d reaches $d_1$, and it has been confirmed that the electrodes are insulated therebetween at the displacement d exceeding $d_1$.

(Test example 2)

A pressure sensing device similar to test example 1 was obtained through working the pressure sensing element 4 into a circular body 6 mm in outside diameter, 2 mm in inside diameter and 1 mm in thickness. With $R_0=8\Omega$, $d_1=0.32$ mm and $F_1=50$ g, the pressure sensing device operates as an exceedingly fine pressure sensor wherein a resistance value between the electrodes increases in accordance with an increase of the displacement d of the actuator 3 until the displacement d reaches $d_1$, and it has been confirmed that the electrodes are insulated therebetween at the displacement d exceeding $d_1$.

(Test example 3)

A pressure sensing device similar to test example 1 was obtained through the construction wherein a spring constant of the pressure-welded spring 5 was specified at 10 g/mm, and it was ready for locking through compression by 2.5 mm. With $R_0=25\Omega$, $d_1=0.12$ mm and $F_1=25$ g, the pressure sensing device operates as an exceedingly fine pressure sensor wherein a resistance value between the electrodes increases in accordance with an increase of the displacement d of the actuator 3 until the displacement d reaches $d_1$, and it has been confirmed that the electrodes are insulated therebetween at the displacement d exceeding $d_1$.

(Test example 4)

The pressure sensing element 4 of test example 3 was replaced with a conductive rubber used for a switch of the same shape, and from operating it as in the case of test example 3, $R_0=21\Omega$, $d_1=0.02$ mm and $F_1=25$ g, thus indicating a switching characteristic wherein an interelectrode resistance value rose abruptly on a slight displacement of the actuator 3.

(Test example 5)

A pressure sensing device in the construction similar to test example 2 and also in the structure similar to FIG. 1 was obtained through locking the pressure-welded spring 5 in compression by 0.5 mm. The pressure sensing device is $R_0=2.1K\Omega$, $d_1=0.08$ mm and $F_1=10$ g, and from working an external force on the side of shaft 34 of the actuator 3, $R_0=10\Omega$, $d_1=0.31$ mm to the 40 g external force, thus operating as an exceedingly fine pressure senser wherein interelectrode resistance value decreases according as the external force increases. However, since an after stroke could not be secured, a construction (not indicated) was considered such that the external force would work directly on the pressure-welded spring 5, and a force of the pressure sensing element 4 to the electrodes would increase in accordance with an increase of the external force, thus securing the after stroke firmly.

Other embodiments given in FIG. 2 and FIG. 3 will be described, next.

First, as compared with the embodiment of FIG. 1, that of FIG. 2 is identical thereto except a construction of the actuator 3.

That is, the operating shaft 31 of the actuator 3 is not projected toward the high molecular conductor 4 and the substrate 2 but is projected outward as a shaft sliding along the through hole 11 on the side of armored case 1, an L-shaped arm 32 is fixed on a nose of the operating shaft 31, and an external force is received from a nose portion 33 of the L-shaped arm 32.

That is, while the actuator 3 is operable in a center domain to the high molecular conductor 4 and the substrate 2 in the embodiment of FIG. 1, it is operatable in a side domain in the embodiment of FIG. 2.

Then, FIG. 3 represents a case where the actuator 3 is operable in a side domain as in the case of FIG. 2, and the construction is such that a lever 33 is projected on a side of the actuator 3 to come outward of an aperture 12 of the armored case 1, and thus the force F is allowed to work externally on a lever touch.

Further, instead of installing the pressurewelded spring 5 within the armored case 1, a pressurewelded leaf spring 51 has its base end fixed externally of the armored case 1 and the other end welded on pressure to a top end of the operating shaft 31 of the actuator 3.

A function of both the embodiments of FIG. 2 and FIG. 3 is similar to the embodiment given in FIG. 1, therefore a detailed description will be omitted thereon here, and a similar characteristic of performance was indicated in the foregoing test examples even from modifying a structure of the actuator like FIG. 2 and FIG. 3, thus obtaining a satisfactory pressure sensing device.

A further embodiment will be described with reference to FIG. 4.

In the embodiment, the actuator 3 is turnable on a pivot 3a, a spring 52 is inserted in the pivot 3a to push the high molecular conductor 4 toward the electrodes 21a, 21b at all times. Then, the construction is such that an external force is applied on the nose portion 32 of the actuator 3.

Since the function is identical with the above-described embodiment, no further description will be given here. Then, while the armored case is omitted in the illustration, it can simply be formed by covering along a chain line.

According to the invention, the pressure sensing device is constructed such that an external force (pressure) is applied to the circuit substrate provided at least with a pair of electrodes through the high molecular conductor, therefore it is ready for some switching operation on a special electrical change or pressure resistance change according to an external force working on the high molecular conductor and a tension of the spring, and further the embodiments given in FIG. 1 to FIG. 3 are constructed such that the high molecular conductor is pressed and retained on the electrodes by a force of the pressure-welded spring, a desired resistance circuit is formed between at least one pair of electrodes, and further when an external force works through the actuator, the pressure-welded spring force changes to adjust a resistance value of the resistance circuit, thus providing the following effects:

(1) Initial resistance value stabilized.

There is formed a resistance circuit between the electrodes despite no external force working then, therefore an initial resistance value will be stabilized.

(2) Free from erroneous operation due to vibration.

Since the high molecular conductor is pressed on the electrodes, an erroneous operation is hardly caused by vibration.

(3) Highly sensitive for detection.

Since the high molecular conductor is employed as a pressure sensing element, a resistance value changes sharply against pressure, and thus a high sensitivity for detection is secured.

(4) High in detection precision.

Since an elastic deformation of the high molecular conductor is utilized, a change in resistance value against pressure can be reproduced in high precision.

(5) High in reliability.

Characteristics can be reproduced satisfactorily from adjusting a deformation of the high molecular conductor pressed on the electrodes within elasticity limits, thus securing a high reliability.

(6) After stroke ensured.

After stroke can be taken thoroughly by the spring.

(7) With less secular change.

The high molecular conductor kept in contact at all times with the electrodes may provide a dustprotective effect of a contact surface, and thus a secular change of characteristics is minimized.

Accordingly, the pressure sensing device can be utilized extensively for shift position control of various equipment and machinery, pressure control, detecting means and so forth.

I claim:

1. A pressure sensing device consisting of at least one pair of electrodes, a high molecular pressure sensitive conductor provided between the electrodes and forming a resistance circuit therewith, said conductor being formed of resilient material and having a resistance variable in accordance with pressure applied thereto, first means for applying compressive force upon said pressure sensitive conductor to increase the conductivity thereof and second means for applying simultaneously to said first means a force opposing said compressive force whereby the resistance of said circuit will be a function of both said forces.

2. A pressure sensing device as defined in claim 1, characterized in that one of said means comprises a spring, the other of said means comprises an actuator acting against the force of said spring.

3. A pressure sensing device as defined in claim 2 constructed such that the force of said spring is exerted on said high molecular conductor, and the high molecular conductor is thereby brought into contact with said at least one pair of electrodes to form a resistance circuit between the electrodes, and the external force is exerted by said actuator.

4. The pressure sensing device as defined in claim 2, including a case, and said at least one pair of electrodes, said high molecular conductor, said spring and said actuator are contained in said case, said actuator having an operating shaft said shaft projecting externally of said case to receive an external force.

5. The pressure sensing device as defined in claim 2, wherein said at least one pair of electrodes are circuit substrates paired in plane.

6. The pressure sensing device as defined in claim 2, wherein said at least one pair of electrodes is disposed to contact the high molecular conductor therebetween.

7. The pressure sensing device as defined in claim 2, wherein the high molecular conductor is a pressure sensing element with a resistance value which decreases according as pressure increases.

8. The pressure sensing device as defined in claim 5, wherein the operating shaft of the actuator extends vertically to the plane including said at least one pair of electrodes.

9. The pressure sensing device as defined in claim 2, wherein the high molecular conductor is formed of a conductive rubber material with conductive particles dispersed uniformly therein, and when compressed said conductive particles come closer to each other, thereby decreasing the electrical resistance of said conductor.

* * * * *